US008583458B2

(12) United States Patent
Bolano et al.

(10) Patent No.: US 8,583,458 B2
(45) Date of Patent: Nov. 12, 2013

(54) DYNAMIC SYSTEM AND METHOD FOR AUTOMATED CHECKING AND TRANSMITTING OF DAMAGE REPORTS AND DAMAGE CLAIMS

(75) Inventors: Manuel Bolano, Neftenbach (CH); Loraine Van Eeden, Langnau am Albis (CH); Arnold Glogg, Willerzell (CH)

(73) Assignee: Swiss Reinsurance Company Ltd., Zurich (CH)

( * ) Notice: Subject to any disclaimer, the term of this patent is extended or adjusted under 35 U.S.C. 154(b) by 697 days.

(21) Appl. No.: 11/793,545

(22) PCT Filed: Dec. 21, 2005

(86) PCT No.: PCT/EP2005/057056

§ 371 (c)(1), (2), (4) Date: Aug. 22, 2008

(87) PCT Pub. No.: WO2006/069952

PCT Pub. Date: Jul. 6, 2006

(65) Prior Publication Data

US 2009/0119132 A1 May 7, 2009

(51) Int. Cl.
*G06Q 10/00* (2012.01)

(52) U.S. Cl.
USPC .......... 705/4; 705/1.1

(58) Field of Classification Search
USPC .......... 705/4, 1
See application file for complete search history.

(56) References Cited

U.S. PATENT DOCUMENTS

| | | | | |
|---|---|---|---|---|
| 5,950,169 | A * | 9/1999 | Borghesi et al. | 705/4 |
| 6,263,315 | B1 * | 7/2001 | Talluri | 705/8 |
| 6,810,382 | B1 | 10/2004 | Wamsley et al. | |
| 7,801,750 | B1 * | 9/2010 | Wallach et al. | 705/4 |
| 7,890,355 | B2 * | 2/2011 | Gay et al. | 705/4 |
| 2002/0156656 | A1 * | 10/2002 | Harrell et al. | 705/4 |
| 2004/0122717 | A1 | 6/2004 | Hancock | |
| 2004/0220784 | A1 | 11/2004 | Stephenson et al. | |
| 2005/0222867 | A1 * | 10/2005 | Underwood et al. | 705/2 |
| 2009/0132294 | A1 * | 5/2009 | Haines | 705/4 |

FOREIGN PATENT DOCUMENTS

| | | | |
|---|---|---|---|
| EP | 1 220 131 | A2 | 7/2002 |
| WO | WO 01/93173 | A1 | 12/2001 |

OTHER PUBLICATIONS

Lisa howard, Aviva takes “ri3k” for Jan. 1 treaties, National Underwriter, Dec. 16, 2002, vol. 106, Issue 50, p. 1.*

* cited by examiner

*Primary Examiner* — William Rankins
(74) *Attorney, Agent, or Firm* — Oblon, Spivak, McClelland, Maier & Neustadt, L.L.P.

(57) ABSTRACT

The present invention relates to a dynamic system and a corresponding method for automated checking and transmitting of damage reports and damage claims in multi-level damage coverage systems. The dynamic system comprises decentralized, cellular capturing units with assigned areas for capturing damage records, a central unit being bidirectionally connected via a network to the capturing units. The central unit comprises a filter module for selecting first and second damage records based on assigned threshold values, an analysis module for detecting and eliminating first damage records wrongly captured by means of the capturing units, and a regulator module for dynamic adjustment of the threshold values assigned to the respective areas based on the filtered first damage records. Finally, the filtered first damage records, without wrongly captured first damage records, are transmitted to the processing device and are released for multi-level damage coverage, by means of the central unit.

16 Claims, 4 Drawing Sheets

DYNAMIC SYSTEM AND METHOD FOR AUTOMATED CHECKING AND TRANSMITTING OF DAMAGE REPORTS AND DAMAGE CLAIMS

The present invention relates to a dynamic system for automated checking and transmitting of damage reports and damage claims, as well as a corresponding method. In particular, the invention relates to checking and transmitting systems which are used with multi-level damage coverage systems.

Every year many cases of damage occur in industry and business with high amounts of loss. Such cases of damage also occur with private persons, however. On the one hand, this involves damages which arise for industry and business through external circumstances of some kind, such as, for example, storms (hurricanes, floods, etc.), fire, war, terrorist attacks, etc. On the other hand, this also relates to damages which occur through facts of liability, such as, for example, product liability (in particular in the chemical or pharmaceutical industry, etc.) or work carried out incorrectly or unprofessionally. Through the general tendency toward globalization and the accompanying agglomeration of industry and the worldwide distribution of products, such damages more and more frequently reach multi-digit amounts in the millions or even billions. Thus the continuing existence of whole company branches and branches of enterprise depend upon a careful, efficient coverage of possible damages. In order to secure also the coverage of high loss amounts, there exist today in most cases multi-level insurance systems with primary insurance and reinsurance. With reinsurance, the coverage for a single risk or a multiplicity of single risks with common features is transferred completely or partially from a primary insurer to another insurer, without terminating the original insurance. The primary insurer can thereby pass on to the reinsurer partial amounts of the insurance sum to be paid, which is why reinsurance is also designated as insurance of the insurers. Only through the co-operation between a primary insurer and a reinsurer can the damage coverage be successfully ensured even for large-scale risks and damage events in each case.

Technical basis for an effective damage coverage is the secure and error-free capturing, assigning, checking and transmitting of the cases of damage which have occurred. Besides the actual loss amount, more and more cases of damage with unclear legal situation are frequently accompanied by long drawn-out and cost intensive court proceedings. Such pending proceedings often lead to great insecurity on the part of potential investors (for example stock market investors) for the industry involved, as many examples from the chemical, tobacco and food industry prove, as well as from the automobile and construction industry (earthquake stability of structures, etc.). Furthermore it is of course clear that an insurance system should be as secure as possible against cases of damage incorrectly reported or reported with fraudulent intent with corresponding demands since otherwise the operation as such in put into question. With the large number of cases of damage, the individual case can hardly be checked sensibly anymore without an effective automation of the method. It therefore meets a great need of the industry to have a functioning, efficient and automated checking of the cases.

In the state of the art today normally the individual damage cases are checked only by the primary insurer for their accuracy and correctness. Secondary or reinsurers check the damage cases usually only with respect to formal requirements and even there only by random sampling. It is the conventional methods of damage capturing themselves which tend to be full of errors. Contributing considerably thereto in particular are the manual recording, entry and processing of the data. A distinction can be made usually between the capturing of a loss under administrative or respectively formal criteria (administrative accounting) and technical criteria (technical accounting). Both capturing methods are typically carried out manually or at best in a semi-automated way. The same applies for the secondary or reinsurers. With the reinsurers the situation is usually even more difficult since the reinsurers frequently do not simply have access to the databases of the primary insurer. Thus the checking of the damage claims by the reinsurer is usually limited to checking random samples.

In the state of the art therefore numerous automatic or semi-automatic methods for checking the accuracy of the damage claims are known. Thus, for example, U.S. Pat. No. 6,810,382 shows such a checking method for damage claims with illness and/or accidents. In a first step, a damage event is recorded, in a second step the data of the damage claim are further processed, and the amount of the settlement negotiated, and in a third step, finally, the loss amount is settled or respectively paid as compensation to the corresponding persons. Although this method automates individual steps, it still does not allow any completely automated control and checking of the cases of damage. Another control method is presented, for example, in the U.S. published application US 2004/0220784. This method allows prediction of the number and size of cases of damage for a particular insurance policy. Thus this method likewise allows indirectly a certain checking of the damage cases, even for secondary or respectively reinsurers. The drawback of this state of the art is that the individual cases of damage are not really able to be checked, but instead the checking is based solely on stochastic predictions.

Also in the U.S. published application US 2004/0122717 a checking method for damage claims is shown in which in particular damage claims in the case of diseases and dentist visits are able to be accurately captured and passed on. For this purpose the method uses a first database with insurance-related information about the respective insured party and a second database with insurance-relevant information about the respective physicians or dentists. The entered damage claims are compared with the information in the respective databases, so that in each case only the accurate data from the databases are passed on to the insurer. This method too has the drawback that only certain information on the captured cases of damage can be checked, while many relevant indications continue not to be able to be checked in an automated way.

A further system is described in the international patent application WO 01/93173. It makes possible an efficient and simple transmission of damage claims via a computerized system. In particular this system is suitable for transmitting illness data of a patient from a physician to the corresponding insurance. The data to be transmitted are adapted in each case to the formal requirements of each insurer so that they are also checked indirectly with respect to their consistency and accuracy. The described system cannot ensure, however, an automated systematic checking of the data to be transmitted. Finally, in the European patent application EP 1 220 131 a transmission system for the damage claims is also shown, in which the compensation is reimbursed through substitute products. In this system, however, damage claims are not checked in an automated way.

It is therefore the object of this invention to propose a dynamic system and a corresponding method for automated checking and transmitting of damage reports and damage claims, which do not have the above-mentioned drawbacks of the state of the art. In particular it should be a solution which allows, in multi-level systems for damage coverage, to capture cases of damage, to assign them, to check them and to transmit them, and, if need be, to adjust them accordingly. At the same time the system should be able to adapt itself dynamically.

This object is achieved according to the present invention through the elements of the independent claims. Further advantageous embodiments follow moreover from the dependent claims and the description.

In particular these objects are achieved through the invention in that the dynamic system comprises cellular, decentralized capturing units with assigned areas for capturing damage records based on first control parameters, a damage record comprising at least one event parameter for the respective area, the system comprises a central unit, which central unit is bidirectionally connected via a network to the capturing units, at least event parameter data being transmittable from the capturing units to the central unit, the central unit comprises a filter module for selecting first and second damage records based on at least one threshold value assigned to the respective area, the central unit comprises an analysis module for detecting and eliminating, based on second control parameters, first damage records wrongly captured by means of the capturing units, the central unit comprises a regulator module for dynamic adjustment and storing of the threshold values, assigned to the respective areas, based on the filtered first damage records, and by means of the central unit, the filtered first damage records, without wrongly captured first damage records, are transmittable to the processing device, whereby they are released for multi-level damage coverage. The second control parameters can comprise, for example, at least data for automated checking of cash call and/or countersigning and/or policy and/or period of validity and/or risk threshold for the respective area and/or ex-gratia payments. This invention has the advantage, among others, that damage reports and damage claims in multi-level damage coverage system can be captured in an automated way, checked and smoothly transmitted between the various system levels. Moreover the invention has the advantage, among others, that the dynamic system can adapt itself or respectively the thresholds assigned to an area to a particular area in a self-organizing way. First, this allows a complete automation of the system or respectively of the method. Further, an automated checking, monitoring and filtering of the damage reports or respectively of damage claims can also be carried out by secondary insurers or reinsurers, without only random samples being able to be checked (peer review). The automated checking and monitoring of the cases of damage enables primary and reinsurers to better assess the risk and adjust the premiums accordingly. In particular the system or respectively the corresponding method is also suitable for personal injuries, for instance in health and/or life insurance systems (such as, for example, cases of death and/or disease, etc.) as well as accident consequences for persons, etc., and not just for PNC coverage (such as, for example, daily benefits coverage and/or passenger coverage and/or coverage for pillion passengers on motorcycles, etc.) The system can be achieved in a completely automated way and/or in a semi-automated way, whereby with semi-automation individual modules and/or system components are implemented manually. In particular it can make sense, for instance, for the damage validation to be achieved manually in the system for reason of internal work flows. The components needed for the system can be achieved through hardware and/or software, for example. As a check system, for example, the system according to the invention can have contrasted the manually captured data of a technical accounting, also directly, for instance by means of a reporting module, and compared in an automated and/or semi-automated and/or manual way. Any irregularities could then be captured by the system, for example, and filtered out. The check system can also be used, for example, as interim module in the work flows of the technical accounting, however, without the system according to the invention having a direct connection to a bookkeeping and/or billing system. For example, the system would thereby be based on certain damage records or respectively damage events or respectively damage cases being taken out of the technical accounting process, and passed on to the system according to the invention for individual assessment. Afterwards the damage records would flow back again into the normal technical accounting process for final processing, for example.

In an embodiment variant, the central unit comprises a calculation module for determining premiums for customer parameters assigned to an area. This embodiment variant has the advantage, among others, that the premiums can be automated, optimized and adapted. Thus at any point in time the most optimal premium for the customer can be simply and quickly calculated based on the latest data.

In another embodiment variant, the calculation module comprises means for iterative adjustment of the premiums based on the corrected first and second damage records. This embodiment variant has, among others, the same advantages as the preceding embodiment variant, the iterative adjustment of the premiums representing an especially advantageous adjustment method from the range of possible adjustment methods.

In still another embodiment variant, the central unit comprises an expert module for checking medical information data, if these are assigned to a damage record. This has the advantage, among others, that damage reports in the health area can also be monitored and checked in a simple and automated way.

In a further embodiment variant, the second control parameters comprise at least one upper claim threshold, all damage records above the claim threshold value being automatically assigned to the first damage records. This has the advantage, among others, that all damage reports which lie above a particular loss amount are also really checked and examined by the system.

In an embodiment variant, the central unit comprises means for checking multiple claims, all damage records above the claim threshold value being automatically assigned to the first damage records. This has the advantage, among others, that events which are erroneously captured in double, for example, or multiply captured, are automatically recognized by the system and filtered out, whereby considerable savings in time and materials are made possible.

It should be stated here that, besides the system according to the invention, the present invention also relates to a corresponding method.

Embodiment variants of the present invention will be described in the following with reference to examples. The examples of the embodiments are illustrated by the following attached figures.

Figure 1:
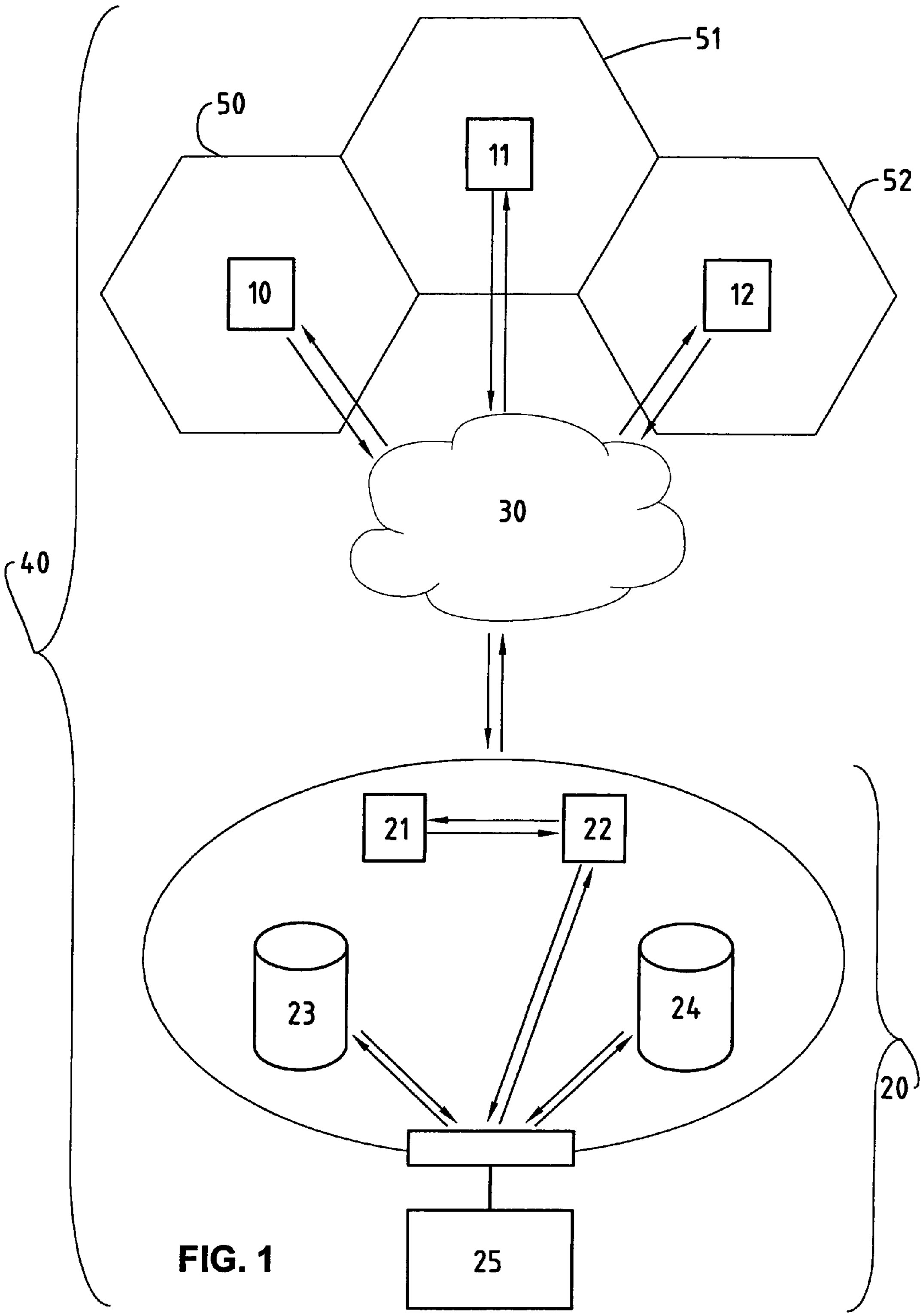
FIG. 1 shows a block diagram showing schematically an embodiment example of a dynamic system 40 according to the invention for automated checking and transmitting of damage reports and damage claims.

FIG. 1 illustrates an architecture which can be used to achieve the invention. In this embodiment example, the dynamic system 40 for automated checking and transmitting of damage reports and damage claims in multi-level damage coverage comprises decentralized, cellular capturing units 10/11/12 with assigned areas 50/51/52. By means of the capturing units 10/11/12, damage records or respectively corresponding cases of damage can be captured based on first control parameters, for example in a cellular way. The capturing units 10/11/12 can be assigned to primary insurers, for example, be completely automated or semi-automated, and comprise corresponding components of hardware and/or software design. A damage record and/or damage event can comprise one or more event parameters for the respective area.

The control system 40 comprises a central unit 20. The central unit 20 is connected bidirectionally to the capturing units 10/11/12 via a network 30. The network 30 can include, for example, networks such as LAN (Local Area Network), WAN (Wide Area Network) or the Internet, for instance via the public switched telephone network (PSTN: Public Switched Telephone Network) or a mobile radio network (PLMN: Public Land Mobile Network) such as, for example, GSM (Global System for Mobile communication) or UMTS networks (Universal Mobile Telephone System), etc.

Via the network 30, at least event parameter data are transmittable from the capturing units 10/11/12 to the central unit 20. The capturing units can be unambiguously identifiable and/or able to be authenticated by the central unit, for example by means of an identification module. The central unit 20 comprises a filter module 22 for selecting first and second damage records based on at least one threshold value assigned to the respective area 50/51/52. The central unit 20 comprises an analysis module 21 for detecting and eliminating, based on second control parameters, first damage records wrongly captured by means of the capturing units 10/11/12. Filter module 22 and analysis module 21 can be achieved e.g. through hardware and/or software. The second control parameters can comprise, for example, at least data for automated checking of cash call and/or countersigning and/or policy and/or period of validity and/or risk threshold for the respective area 50/51/52 and/or ex-gratia payments. The second control parameters can also comprise at least one upper claim threshold value, all damage records above the claim threshold value being automatically assigned to the first damage records.

The filtered first damage records, without wrongly captured first damage records, are transmitted to a processing device 25, by means of the central unit 20, whereby they are released for single and/or multi-level damage coverage. The threshold values assigned to the respective areas 50/51/52 can be dynamically adjusted, for example, based on the filtered first damage records by means of the regulator module 21 of the central unit 20. The regulator module 21 can also be achieved, for example, through hardware and/or software. The central unit 20 can also comprise, for example, a calculation module 23 for determining premiums for customer parameters assigned to an area. Premiums can thereby be dynamically calculated and/or adjusted area-specifically. The calculation module 23 can moreover comprise corresponding means, developed through hardware and/or software, for iterative adjustment of the premiums based on the corrected first and second damage records.

For applications in the health sector, it can be expedient for the central unit 20 to comprise an expert module 24 for checking medical information data if these are assigned to a damage record. The central unit 20 can comprise in particular means for checking of multiple claims, all damage records above the claim threshold value being automatically assigned to the first damage records. These means can be assigned to the filter module 22, the analysis module 21 or the regulator module 21, or achieved, however, as independent hardware and/or software module.

In the embodiment, a distinction can be made in the system 40, for example, between an administrative accounting and a technical accounting. Of course the two steps can follow in an integrated way, in series or parallel. In the accounting, the system 40 first receives the notification about the capturing and/or the occurrence of a damage record. This can take place, for example, by means of a capturing unit 10/11/12 as the external automated or semi-automated reporting service, by means of an individual damage report, by means of a damage call (cash call), by means of other damage recovery applications and/or an incoming damage account or damage record. This can comprise in particular, for example, the reading of a claim form, of an electronic claim, of a report over the Internet (for example by means of secure file transfer), of a mailed letter or an electronic mail, etc. As the next thing, the system 40 can comprise formal or respectively administrative requirements such as, for example, signature, countersignature, date of the damage report (data bordereaux), cash call, etc. The claim of the corresponding damage record is place in the system 40 on "notified," whereupon the loss amount is reserved, for example by means of the processing device 25. Furthermore the completeness of the required data can be checked, for example, and if not complete, corresponding steps initiated for supplementation or rejection of the claim. In the same way, for example, further definable administrative criteria can be checked by means of the system 40, such as, for instance, policy insufficient, or not even reinsured and/or not covered by corresponding policy, premiums not paid, etc. The damage records, which should be checked further, can be based on the following criteria, for example: damage sums, the amounts of which are greater than the area limit and/or threshold of the assigned area 50/51/52, voluntarily made payments or respectively ex-gratia payments of the primary insurer and/or claims which extend, for example, over a larger period than specified, and/or claims which contain clear signs of fraud and/or fraudulent intent of the user/client or manipulation of the capturing unit 50/51/52 and/or damage events relating to so-called death claims (cases in which the insured is deceased) and living benefit claims (cases in which the loss amounts go to the surviving insured party), etc. Living benefit claims can be <sic. require> additional checks, for example, such as medical information (if available), damage check of the damage claims within a specified time limit, for instance 3 years, by a claims adjuster, etc.

Figure 2:
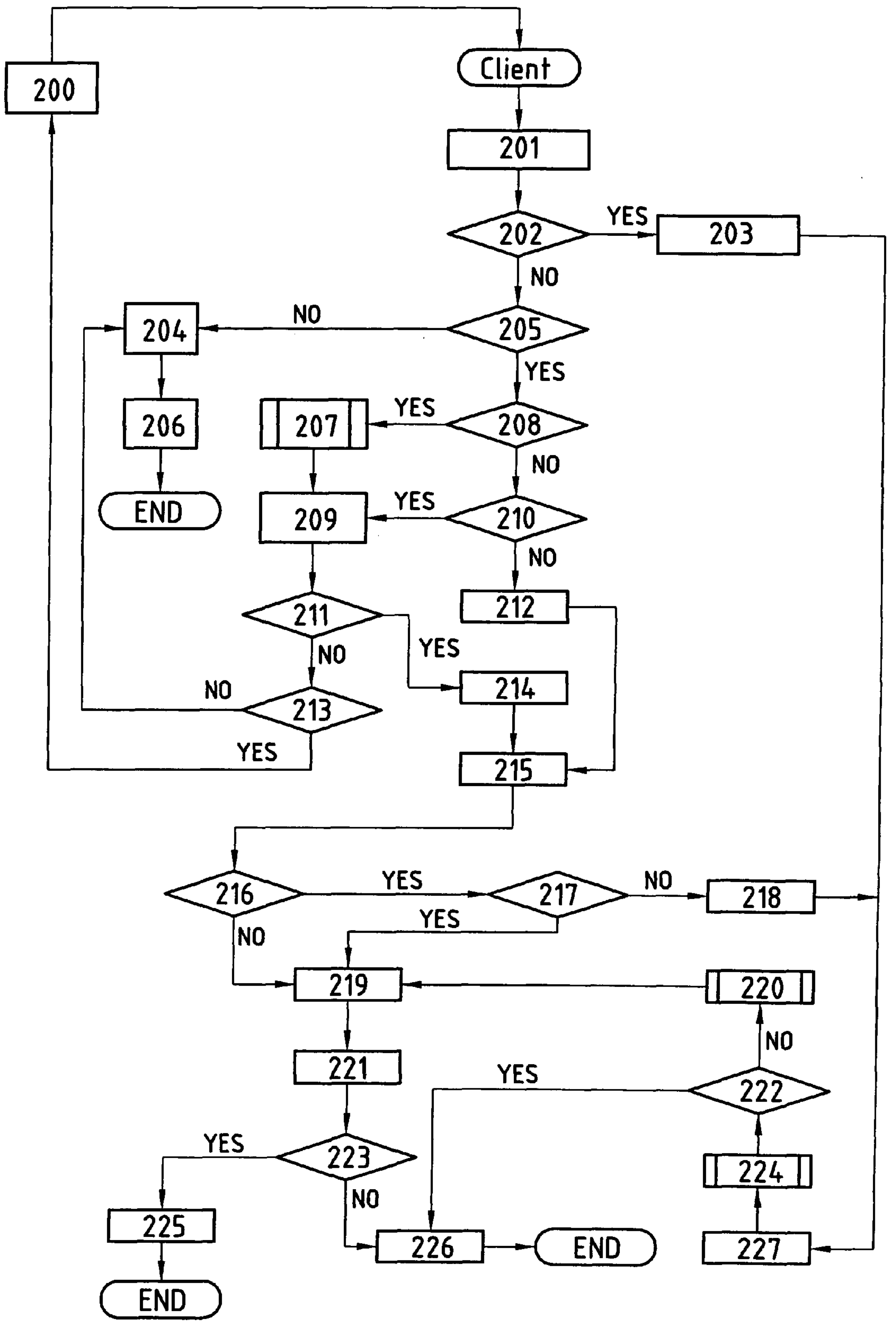
FIG. 2 shows a block diagram, illustrating schematically an embodiment example of a technical accounting according to the invention.

FIG. 2 shows schematically an embodiment example of a technical accounting according to the invention. In reference numeral 201 ($1^{st}$ level), the client (primary insurer or client of a primary insurer) and/or user of the dynamic system 40 sends and/or otherwise transmits a message to the technical accounting and/or operator of the dynamic system 40. In the second level (reference numeral 202), the damage record or respectively damage event is checked for ex-gratia, and 203 captures the corresponding data, if it is an ex-gratia case. In step 205 ($3^{rd}$ level) it is checked whether assignable reinsurance contracts or respectively policies exist for the event. If not, the damage record or respectively damage event is rejected 204. 208 ($4^{th}$ level) checks the event for a cash call. With a cash call 207, the event is forwarded to an accelerated processing directly to the $6^{th}$ level 209. If it is not a cash call 210, the central unit checks in level 5, whether it is an isolated damage event, or whether further damage events are associated or respectively correlated therewith. If not, there takes place as above the transfer to the $6^{th}$ level 209 for processing or respectively validation of the claim. The validation level 6 will be described more precisely further below in particular with the aid of FIG. 3. If correlating damage records exist, then by means of 212, all correlating damage records are filtered out of the damage records. If, according to the $6^{th}$ level 209, a damage record is validated as "not in order" 213, the damage record is either rejected 204 or further information is requested or captured 200 by the central unit 20. In the $7^{th}$ level 214, finally, the reference list is checked and in the $8^{th}$ level 215 the loss amount reserved in the system. Under definable boundary conditions 216, a particular damage record can be passed on to further specialized expert modules 218 or other checking units 218. In particular, damage record <sic. records> can already be released for payment here 217, if necessary. If the damage record is released for payment, the $9^{th}$ level 219 takes over the accounting and payment of the loss amount. This can take place in an automated or semi-automated way. In reference numeral 221, the central unit 20 supplements the data with respect to the information necessary for the billing. In the $10^{th}$ level, 223 further expert systems and/or modules can be added, and the data released for further checking 225. The payment or respectively the billing of the loss amount can be carried out in dependence upon, or independently of, the results under 225, for example. In particular the $10^{th}$ level with 226 can comprise the storage and administration of classified (paid/rejected/not yet paid/pending, etc.) damage records. The reference numeral 227 can comprise, for example, an expert system automated or semi-automated through hardware and/or software, which system additionally checks the transmitted (for example suspected) damage records 224. If a damage record is rejected, the data are transmitted directly to 226 for storage, for example. If a damage record is accepted 220, on the other hand, the described billing method can begin with 219.

Figure 3:
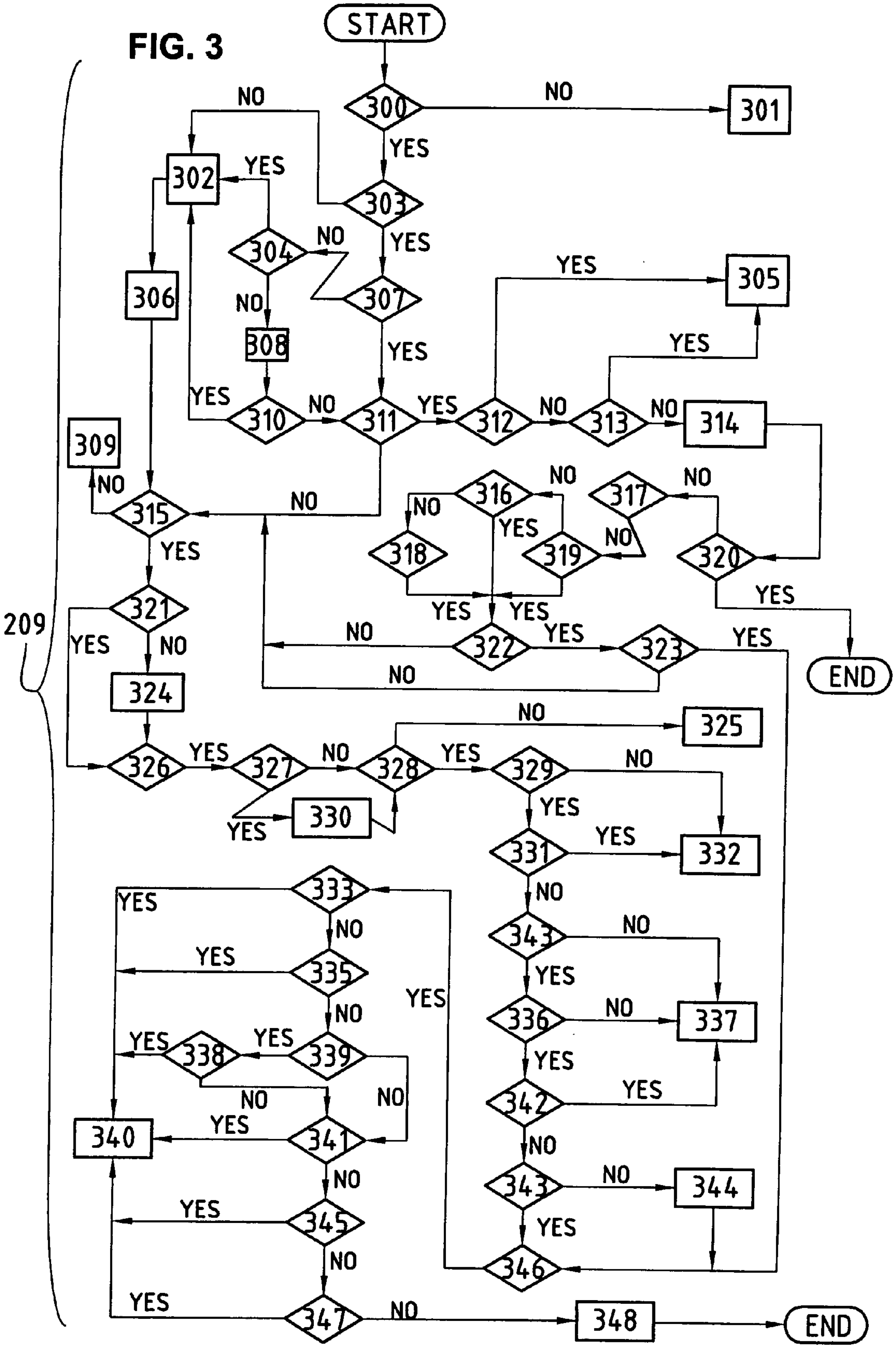
FIG. 3 shows a block diagram, illustrating schematically a claim checking (reference number 209) of an embodiment example of a technical accounting according to FIG. 2 or respectively the invention.

FIG. 3 shows a possible embodiment example of the validation level 6. In reference numeral 300 it is thereby checked whether all information necessary for the validation are available to the system 40. If not, further information are requested 301. By means of 303 it is checked whether involved is an isolated damage record or respectively damage event, or whether further damage events are associated or respectively correlated therewith. If not, there takes place, as above, transfer to 302 for collecting and/or storing of the damage records and for further processing or respectively validation of the claim. If correlating damage records exist, then by means of 302, all correlating damage records are filtered out of the damage records or respectively collected. The reference numeral 306 comprises a random module for random selection of damage records. 315 checks whether the respective damage record can be assigned to a reinsurance contract or policy, or not. If not, the damage record is rejected 309. For isolated damage records according to 303, for example, it can be established with predefinable conditions whether the damage record should be examined individually or not 307. If not, it can be decided by means of 304, for example, whether the damage record should be recognized 310 or not. If not, correlating damage records can be sought through random sampling, for example, (e.g. damage records fraudulently or erroneously captured in double or multiply). If the damage record is not recognized, it is checked in 312, whether the same damage record was already captured. If yes, the damage record is rejected 305. If not, it is checked by means of 313, whether the damage record has already been rejected. 314 supplements the corresponding damage record through additional information, if available in the system. By means of definable conditions, the $6^{th}$ level can thereby be concluded 320, or it can be checked whether payments or respectively further payments 319 are necessary, for example based on a change in the insurance benefits. 316 checks whether modifications based on 319 are necessary, and if not, it can be checked, for example by means of 318, whether <an> already closed case is to be reopened. 322 checks a possible assignment to already existing, similar cases, for example to damage records based on the same or comparable matter. 321 checks, for example, whether a contract assignable to the damage record is legally valid and signed. If not, by means of 324, corresponding units can be notified, for example, and/or data transmitted to the corresponding units. 326 checks whether the policy assignable to the damage event is reinsured. If it involves a voluntary insurance coverage 327, stricter and/or additional payment conditions for acceptance can be examined, for example 330, if not 328. If the premiums assigned to the contract have not been properly paid, the damage record can be rejected 325.

If the payment of the premium or premiums can be assigned 329 by the system 40, it can be examined in a next step with 331, for example, whether involved is a so-called "early claim." If the assignment cannot be carried out by the system 40, the damage record is passed on to the expert unit 332, which undertakes the further processing. The expert unit 332 can be achieved through hardware and/or software, in an automated and/or semi-automated way. If the damage record does not correspond to an early claim, the module 343 checks whether the damage record is sufficiently covered by the insurance policy. If not, the damage record is rejected 337. If the damage record is covered by the insurance policy, the system checks whether this type of insurance policy is covered 336 by the assigned capturing unit 10/11/12 through a reinsurance contract. If not, the damage record is rejected 337. 342 checks whether grounds for exclusion can be assigned to the damage record. If not, the damage record will likewise be rejected here 337. By means of 343 definable parameters can be checked, for example, by means of which the billing point in time can be established, i.e. immediately or at a definable later point in time, for example. The module 344 informs the assigned capturing unit and/or the user and/or claimant correspondingly. By means of 346, for example, the payment amount or respectively the loss amount can be checked. If not, the damage record can likewise be rejected, for example 337, or the loss amount re-established. 333 checks the contractual limits or other contract condition parameters of the reinsurance policy. If the contractual limits are exceeded, the damage event is passed on and/or transmitted to an expert unit 340, which undertakes the further processing. Module 340 and 332 can be carried out by the same system unit, for example. 335 checks the area limits or limit values assigned to the corresponding area 50/51/52. If multiple coverages exist 339, this can change 338 the area limits or other limit values assigned to the corresponding area 50/51/52. If this has no influence upon the area limits or a multiple coverage does not exist, it can be expedient to check further definable characteristics of the damage record by means of parameter of assignable damage record types or respectively damage event types 341. If suspicious facts can be detected, the damage event is passed on and/or transmitted to an expert unit 340, which undertakes the further processing. In checking the damage record, the same can be carried out by means of additional area parameters assigned to the particular area 50/51/52. Reference numeral 347 carries out a concluding and/or summarizing check of the damage record, before it is released for payment or respectively billing 348.

Figure 4:
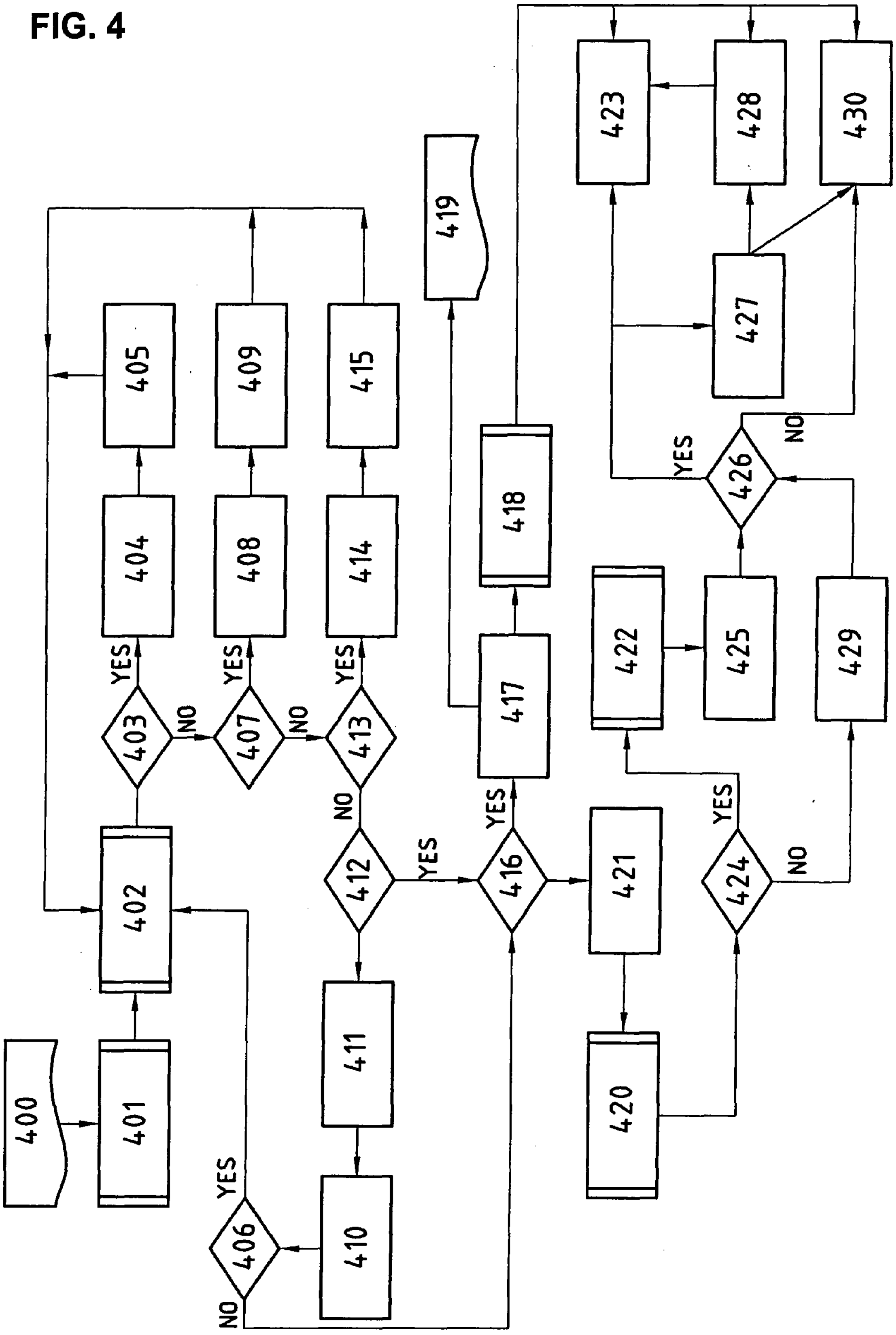
FIG. 4 shows a block diagram, illustrating schematically a dynamic system of a reinsurer according to the invention.

FIG. 4 shows schematically a further dynamic control system of a reinsurer according to the invention. The reference numbers can be indicated, for example, as follows: System 40 contains damage event data from a capturing unit 10/11/12 (technical accounting) 400. Data of the damage record are supplemented for further processing, if necessary 401. With 402 conditional parameters are <designated> such as individual conditions (for example, medical data, work conditional data, activities in the past, members' agreements, employment agreements, damage event estimates or decision conditions, etc.) or general conditions (such as, for example, invoice checks or loss amounts, etc.). If further information is required from the client 403, the corresponding capturing unit 10/11/12 and/or the client is informed 404, and the further information captured 405. If further medical services and/or data are required, the corresponding instruction takes place to a medical unit 408, which captures the required data, and transmits it to the system 40. If legal services and/or data are required 413, the corresponding instruction takes place to a legal unit 414 and/or expert module, which captures the required data, and transmits it to the system 40 415. If the claim lies within the power of attorney 416, it is checked whether the system 40 is able to carry out a decision based on the data 421. If the claim does not lie within the power of attorney 416, a detailed examination by an expert module can take place, for example, which carries out the further steps and decisions or respectively takes over the processing of the damage records. It can likewise collect further information 406. If a decision is possible 416, the system 40 carries out the decision, and informs the parties concerned. The informing can be carried out automatically or semi-automatically, for example. In particular the corresponding displays are done by means of display units 419, e.g. damage estimate data, application data reports, records, etc. Furthermore the corresponding data relating to billing, request for additional information, etc. can be transmitted to the client and/or to the capturing unit 10/11/12, e.g. also by means of the system 40. If no decision is possible 416, the system can transmit the damage record to a module 421 for further detailed processing. During the processing 420, the module 421 can in particular validate the damage record individually, for example, update the operational parameters of the system 40 (whereby the system becomes dynamically changeable or is able to adapt itself to changed conditions), create marketing/sales volume prerequisites, etc. If the sales volume prerequisites are at risk 424, further specialized checking modules can be interconnected, such as modules for checking large loss amounts or ex-gratia payments, for example. Based on their data 422 or in the case of sales volume prerequisites 424, a final decision is reached 425/429 by means of the system 40. The customer can either be directly informed 426 by means of 423, or via the assigned capturing unit 10/11/12, for example 430. If the customer is directly informed, the assigned capturing unit 10/11/12 can also be informed, for example, by means of 427, or via a local representative or a corresponding module 428. All mentioned modules and units can be achieved according to the invention either through hardware or software.

The invention claimed is:

1. A dynamic system for automated checking and transmitting of damage reports in multi-level damage coverage systems, the system comprising:

a plurality of capturing units configured to capture damage records and transmit the damage records to a central unit, the damage records having assigned respective areas for capturing damage records based on first control parameters, a damage record comprising at least one event parameter for the respective area, the capturing units configured to perform an administrative accounting on the damage records including a verification of formal requirements of the damage records, and configured to verify contractual relationships of the damage records and to check whether a damage record is related to an isolated damage event or to additional damage events; and the central unit bidirectionally connected via a network to the capturing units, at least event parameters being transmittable from the capturing units to the central unit, wherein the central unit includes, a filter module for selecting first and second damage records from among the captured damage records based on at least one threshold value associated with a respective area assigned to the first and second damage records, an analysis module for detecting and eliminating, based on second control parameters, first damage records wrongly captured by means of the capturing units, a regulator module for dynamic adjusting and storing of the at least one threshold value, associated with the respective area associated with the first and second damage records, based on the filtered first damage records, excluding the wrongly captured first damage records, and a transmission module for transmitting the filtered first damage records to an external processing device, the filtered first damage records being released for multi-level damage coverage.

2. The dynamic system according to claim 1, wherein the central unit further comprises:

a calculation module for determining premiums for customer parameters assigned to an area.

3. The dynamic system according to claim 2, wherein the calculation module comprises means for iterative adjustment of the premiums based on the filtered first and second damage records.

4. The dynamic system according to claim 1, wherein the second control parameters comprise at least one of data for automated checking of cash call, countersigning, policy, period of validity, risk threshold for the respective area, and ex-gratia payments.

5. The dynamic system according to claim 1, wherein the central unit further comprises:

an expert module for checking medical information data after the medical information data has been assigned to a damage record.

6. The dynamic system according to claim 1, wherein the second control parameters comprise:

at least one upper claim threshold value, all damage records above the upper claim threshold value being automatically assigned to the first damage records.

7. The dynamic system according to claim 1, wherein the central unit further comprises:

means for checking multiple claims, all damage records above the threshold value being automatically assigned to the first damage records.

8. The dynamic system according to claim 1, wherein during said performing the administrative accounting on the capturing units, it is verified whether an underlying policy of the damage record is sufficient, whether a damage sum of the damage record exceeds a threshold, and whether a reinsurance covers the damage record.

9. A method for automated checking and transmitting of damage reports in multi-level damage coverage systems, the method comprising:

capturing damage records by a capturing unit from among a plurality of capturing units, the damage records having assigned respective areas for capturing damage records based on first control parameters, a damage record comprising at least one event parameter for the respective area;

performing an administrative accounting on the damage records at the capturing unit including a verification of formal requirements of the damage records;

verifying contractual relationships of the damage records at the capturing unit and checking whether a damage record is related to an isolated damage event or to additional damage events;

transmitting the damage records from the capturing unit to a central processing unit via a network, after the performance of said administrative accounting;

transmitting the at least one event parameter from the capturing unit to the central processing unit;

filtering the damage records at a filter module of the central processing unit for selecting first and second damage records from among the captured damage records based on at least one threshold value associated with a respective area assigned to the first and second damage records;

analyzing the first damage records at an analysis module of the central processing unit, for detecting and eliminating wrongly captured damage records by means of the capturing units, based on second control parameters;

adjusting and storing the at least one threshold value associated with the respective area associated with the first and second damage records by a regulator module at the central processing unit, based on the filtered first damage records, thereby excluding the wrongly captured first damage records; and transmitting, by a transmission module at the central processing unit, the filtered first damage records to an external processing device, the filtered first damage records being released for multi-level damage coverage.

10. The method according to claim 9, further comprising:

determining premiums for customer parameters assigned to an area by using a calculation module at the central processing unit.

11. The method according to claim 10, further comprising:

adjusting premiums iteratively based on the corrected first and second damage records at the calculation module.

12. The method according to claim 9, wherein the second control parameters comprise at least one of data for automated checking of cash call, countersigning, policy, period of validity, risk threshold for the respective area, and ex-gratia payments.

13. The method according to claim 9, further comprising:

checking medical information data by using an expert module at the central processing unit after the medical information data has been assigned to a damage record.

14. The method according to claim 9, wherein the second control parameters comprise at least an upper claim threshold value, all damage records above the upper claim threshold value being automatically assigned to the second damage records.

15. The method according to claim 9, further comprising:

checking the damage records for multiple claims at the central processing unit, wherein all damage records above the threshold value being automatically assigned to the second damage records.

16. The method according to claim 9, wherein the performing the administrative accounting includes verifying whether an underlying policy of the damage record is sufficient, whether a damage sum of the damage record exceeds a threshold, and whether a reinsurance covers the damage record.

* * * * *